United States Patent [19]
Bard et al.

[11] Patent Number: 5,745,605
[45] Date of Patent: Apr. 28, 1998

[54] DEVICE FOR ESTIMATION OF MOVEMENT

[75] Inventors: Jean-Michel Bard, Crolles; Alain Pirson, Moirans; Philippe Paul, Eybens, all of France; Fathy Yassa, Troinex, Switzerland

[73] Assignee: Deutsche Thomson Brandt GmbH, Villingen-Schwenningen, Germany

[21] Appl. No.: 511,483

[22] Filed: Aug. 4, 1995

[30] Foreign Application Priority Data

Aug. 19, 1994 [FR] France .................. 94 10158

[51] Int. Cl.$^6$ .................. G06K 9/36; H04N 7/12; H04N 5/14
[52] U.S. Cl. .................. 382/236; 348/420; 348/416; 348/699
[58] Field of Search .................. 348/412, 413, 348/416, 420, 402, 407, 409, 415, 430, 431, 699, 700, 701; 382/236, 232, 234

[56] References Cited

U.S. PATENT DOCUMENTS

| | | | |
|---|---|---|---|
| 4,800,425 | 1/1989 | Schwerzel et al. | 348/420 |
| 4,897,720 | 1/1990 | Wu et al. | 348/412 |
| 4,937,666 | 6/1990 | Yang | 348/413 |
| 5,099,325 | 3/1992 | Artieri et al. | 348/420 |
| 5,568,203 | 10/1996 | Lee | 348/699 |
| 5,636,293 | 6/1997 | Lin et al. | 382/236 |

FOREIGN PATENT DOCUMENTS

| | | | |
|---|---|---|---|
| 0276434 | 8/1988 | European Pat. Off. | H04N 7/137 |
| 0395293A1 | 10/1990 | European Pat. Off. | H04N 7/137 |
| 0415737A2 | 3/1991 | European Pat. Off. | G06F 15/70 |

OTHER PUBLICATIONS

IEEE Transactions on Circuit and Systems, vol. 36, No. 10, Oct. 1989 New York, USA pp. 1309–1316, X 000085318 Luc De Vos et al. "Parametrizable VL Architectures for the full–search Block–Matching algorithm".
Copy French Report May 5, 1995.
Copy European Search Report Jul. 17, 1990.
IEEE Transaction on Circuit and Systems, vol. 36, No. 10, Oct. 1989, New York, Luc De Voc et al. "Parameterizable VLSI Architectures for the Full–Search Block–Matching Algorithm".

*Primary Examiner*—Leo Boudreau
*Assistant Examiner*—Wenpeng Chen
*Attorney, Agent, or Firm*—Joseph S. Tripoli; Frederick A. Wein; Alexander J. Burke

[57] ABSTRACT

The disclosure concerns a device for estimation of movement by block matching in an image compression system based on blocks, characterized in that it comprises N lines×M columns of means of calculation of an error function between two values, N×M means of memorization of values representing the block whose movement is to be estimated, N×M means of memorization of values representing a block of a reference window, the two means of memorization being linked respectively to the means of calculation, M means of adding that totalize simultaneously the values of the error function for a column of N elements of calculation. The invention is applicable to image compression.

24 Claims, 7 Drawing Sheets

DEVICE FOR ESTIMATION OF MOVEMENT

BACKGROUND OF THE INVENTION

The present invention relates to a device for estimation of movement and determination of movement vectors in an image compression system based on blocks of pixels. The device according to the invention is used notably in the compression of television images and in systems based on present or future compression standards of the MPEG ("Motion Picture Expert Group").

A number of image compression systems process blocks of pixels. In the case of MPEG, the images are divided into blocks of 8×8 pixels, four blocks being assembled into a macroblock of 16×16 pixels. The blocks or macroblocks undergo various treatments to reduce the redundancy between images and within each image. One of these treatments is the estimation of movement. This procedure consists in estimating the displacement of part of the current image relative to previous or future images. One or more movement vectors that define the displacement are determined; these movement vectors then enable a prediction of the current image to be made based on previous or future images. We then determine the difference between this prediction and the current image, and it is this difference that determines future image compressions. Today, movement vectors are used for so-called "inter" and "bidirectional" images, but can also be applied for "intra" images, with the goal of reducing the effects of possible transmission errors.

The estimation of movement is generally carried out for each macroblock. In the rest of this description, in order to simplify the explanations, we shall associate a single movement vector to each macroblock, this vector being determined from a previous image for a macroblock of the current image. In the place of a previous image, we can also use a reference image memorized in the coder, this image corresponding to the image decoded by a decoder (i.e. an image taking account of the losses of information due to the compression).

A technique for determining the "best" macroblock in the reference image consists in comparing the current macroblock with blocks of similar size in the reference image. As a comparison criterion, we define an error function Err, calculated for each possible position of the macroblock in the reference image. The position giving the lowest value for the Err function will determine the displacement vector. The precision of this vector is variable, since it depends on the available calculation capacity and the pass band reserved for coding the movement vectors. A precision of a fraction of pixel can be achieved by inter-pixel interpolation. If the movement vectors are limited in length, a search window of appropriate size is placed around the position defined by the current macroblock.

The calculation of the movement vectors requires powerful computing resources, which increase with the precision required, the resolution of the image, their frequency, etc.

An error function commonly used is:

$$Err(m,n) = \sum_i \sum_j D(a(i,j), b(i+m, j+n))$$

where i and j designate the positions within a macroblock, m and n are the coordinates of a movement vector, and a and b are respectively the values of luminance of pixels of the current macroblock and of the displaced macroblock of the window or search image.

The function D can be for example $D(x,y) = |x - y|$.

For more information on the use of movement vectors in image compression complying with MPEG standards, see "Information Technology, Generic coding of moving pictures and associated audio, Recommendation H.262 ISO/IEC 13818-2 (Video) Committee Draft of November 1993."

SUMMARY OF THE INVENTION

The goal of the invention is to propose a "block matching processor" having a particularly advantageous architecture.

The goal of the invention is a device for estimation of movement by block matching in an image compression system based on blocks, wherein it includes:

N columns×M lines of means of calculation of an error function (Err) between two values, N×M means of memorization of values representing the block whose movement is to be estimated, N×M means of memorization of values representing a block of a reference window, the two means of memorization being linked respectively to the means of calculation, M means of adding that totalize simultaneously the values of the error function for a column of N elements of calculation.

In a particular embodiment, said device includes a network of N lines of M buffers (B) connected in series, a band of the reference window being propagated column by column in this network.

In a particular embodiment, the output of each buffer is connected to the input of a means of calculation of the error function.

In a particular embodiment, the means of calculation calculates an error function from the value output from the buffer and a value representing the block whose movement is to be estimated.

In a particular embodiment, the result of the calculation of each of the means of calculation is memorized in a buffer.

In a particular embodiment, all the results memorized in the buffers of a given column are totalized by adders.

In a particular embodiment, the result of the addition for a column is supplied to the adder of the next column with a delay that takes into account the propagation of the block of the reference window in the network.

In a particular embodiment, said delay is performed by buffers in series between the adders.

In a particular embodiment, the means of memorization of values representing the block whose movement is to be estimated memorize two pixels values, one of the two values being multiplexed to the means of calculation of the error function.

In a particular embodiment, said two pixel values represent the two upper and lower sub-blocks of a given block, the values supplied at the input of the network being alternating values representing an upper sub-band and a lower sub-band of the reference window, this type of operation being known as "interlaced".

In a particular embodiment, said device includes means of addition of the totalized values of the error function corresponding to these two sub-blocks.

In a particular embodiment, in interlaced mode, a supplementary delay of one calculation cycle is introduced between the adders.

In a particular embodiment, the error function is a function of distance.

In a particular embodiment, each line of buffers is fed by means of memorization of a line of the reference window.

In a particular embodiment, said means of memorization are FIFO (first-in-first-out) stacks.

In a particular embodiment, there are at least N+1 means of memorization of lines, and when N of said means feed the N lines of buffers, the supplementary means of memorization are loaded with values corresponding to the lines that are different between the band of the reference window memorized in said N means of memorization of lines and the band whose processing is immediately consecutive.

In a particular embodiment, a switching circuit is included between the means of memorization of lines and the network of buffers, said means of switching connecting the means of memorization of lines to the appropriate lines of buffers.

Another object of the invention is a device for calculation of movement vectors in an image compression system implementing the device described above, wherein the following are included:

means of input, means of output, means of control associated with a memory, means of memorization of parts of current images and reference images, means of addressing of said means of memorization, means of calculation of error function between the parts of current images and the parts of reference images, and means of interfacing with said means of control.

In a particular embodiment, the means of input are input ports used to load data representing said images into the means of memorization via a data bus.

In a particular embodiment, said data are re-read and fed to the means of calculation of the error function.

In a particular embodiment, means of programming of the means of control are included.

In a particular embodiment, the means of calculation of the error functions include a systolic network of N×M cells.

In a particular embodiment, data is fed to said systolic network via a bank of at least N memories.

Finally, another object of the invention is a complete image compression system including at least one of the previous devices.

BRIEF DESCRIPTION OF THE DRAWINGS

The invention will be better understood and other advantages and characteristics will become clear on reading the following description of a particular embodiment taken only as a non-limitative example, making reference to the appended figures, of which.

The device according to the invention enables different types of movement vectors to be calculated, respecting the requirements of the MPEG standard: vectors for frames or images, vectors of a previous image towards the current image or of a future image towards the current image (known respectively as "forward vectors" and "backward vectors"). In the rest of this description, for reasons of clarity, the example of forward vectors will be taken, but obviously the invention is not limited to the present embodiment.

Figure 1:
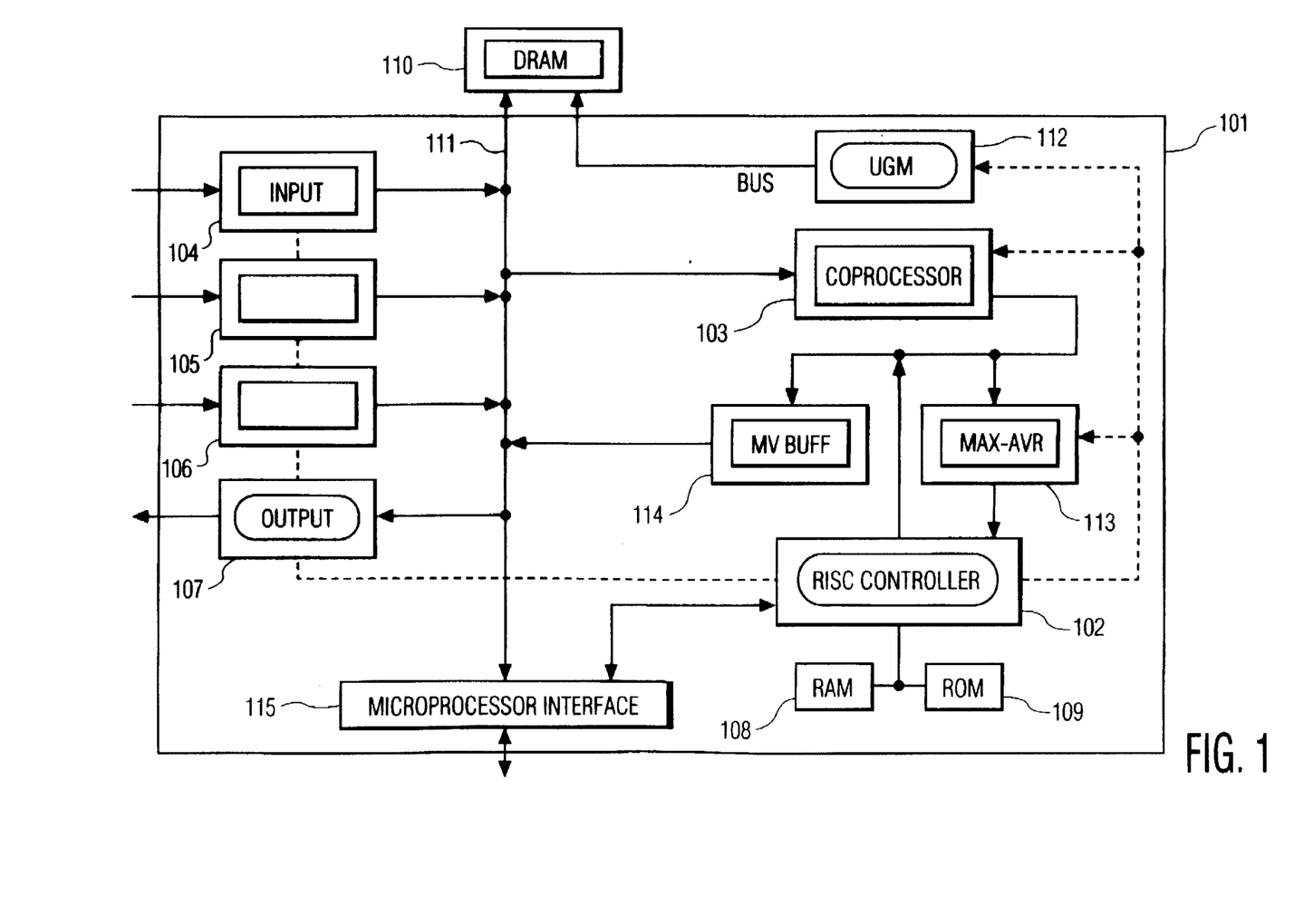
FIG. 1 is a general block diagram of a movement estimation processor according to the embodiment of the invention.

FIG. 1 illustrates the architecture of a movement estimation processor 101. The processor 101 includes a RISC controller 102 (RISC="Reduced Instruction Set Computer"), a systolic network coprocessor 103, three independent input ports 104, 105, 106 for loading the images, an output port 107 to supply the movement vectors, and a local RAM 108 and ROM 109.

The presence of several independent input ports enables the same number of independent video sources to be processed. In a variant, each input port is equipped with a sub-sampling circuit for the implementation of a hierarchic estimation of movement.

These different sub-assemblies mentioned above communicate via a data bus 111 that is connected, among other things, to an external DRAM memory 110. A memory management unit 112 controls movements of data between the local memories. The data corresponding to the images (reference or current) are routed to the dynamic memory 110. They are then re-read and submitted at the appropriate time to the coprocessor 103. The movement vectors calculated by the coprocessor 103 are sent to the dynamic memory 110 via a buffer memory MV BUFF 114. At the appropriate time, these vectors are re-read and transmitted via the output port 107.

The processor 101 is also equipped with a microprocessor interface 115 providing programming and configuration of the RISC controller 102, by down-loading code and calculation parameters. The movement vectors stored in the dynamic memory 110 are also accessible via the interface 115.

A unit MAX-AVR 113 calculates the mean movement vector and maximum movement vector for each image.

The RISC controller 102 is, in the present example, a 19 bit processor with 62 registers and a 64 word data memory. The purpose of the controller 102 is to handle requests from the various units of the processor 101 and activate them at the appropriate time.

The RISC controller 102 is connected to the local RAM 108 and to the local ROM 109, the latter containing regularly-used routines.

In the rest of this description, we shall describe first the operation of a single systolic network. This will enable of the operation of the coprocessor 103 that associates 8 of these networks to be better understood.

Figure 2A:
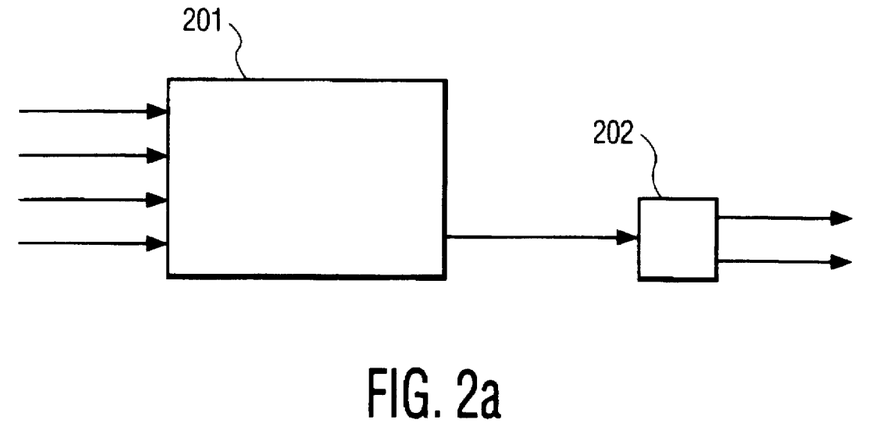
FIGS. 2a and 2b show schematically the comparison strategy used in this embodiment.

FIG. 2a illustrates the circulation of information in the systolic network. The basic function of the network is to compare a current block of pixels with the content of a reference window. The current block is stored in the systolic network 201. The reference window is sent by bands to the network. The error function Err is calculated for each possible position. An element 202 determines the smallest value of the error function and the corresponding movement vector.

Figure 2B:
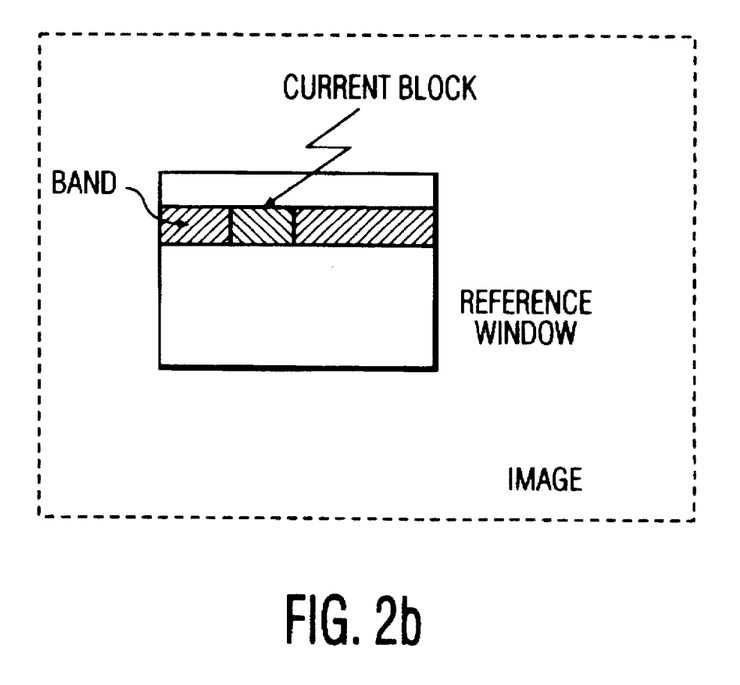

FIG. 2b illustrates the method of determination of the bands to be sent to the systolic network. Each band has a number of lines of pixels that corresponds to the number of lines of the network (4 in the present example). The first band contains the four first lines of the reference window. When the first band has been totally processed, the processing is continued with the next band, which contains the three last lines of the first band and the line immediately consecutive to this first band. In other words, each band is shifted by one line relative to the previous band.

Each band is supplied to the systolic network column by column. The current block, having the same number of lines as each band, is thus compared with all the blocks of same size of each band. At the end, the current block will have been compared with all the blocks of same size of the reference window.

We note that two bands differ only by one line of pixels. This redundancy will be put to use later to limit the loading of the data from the memory 110.

Figure 3:
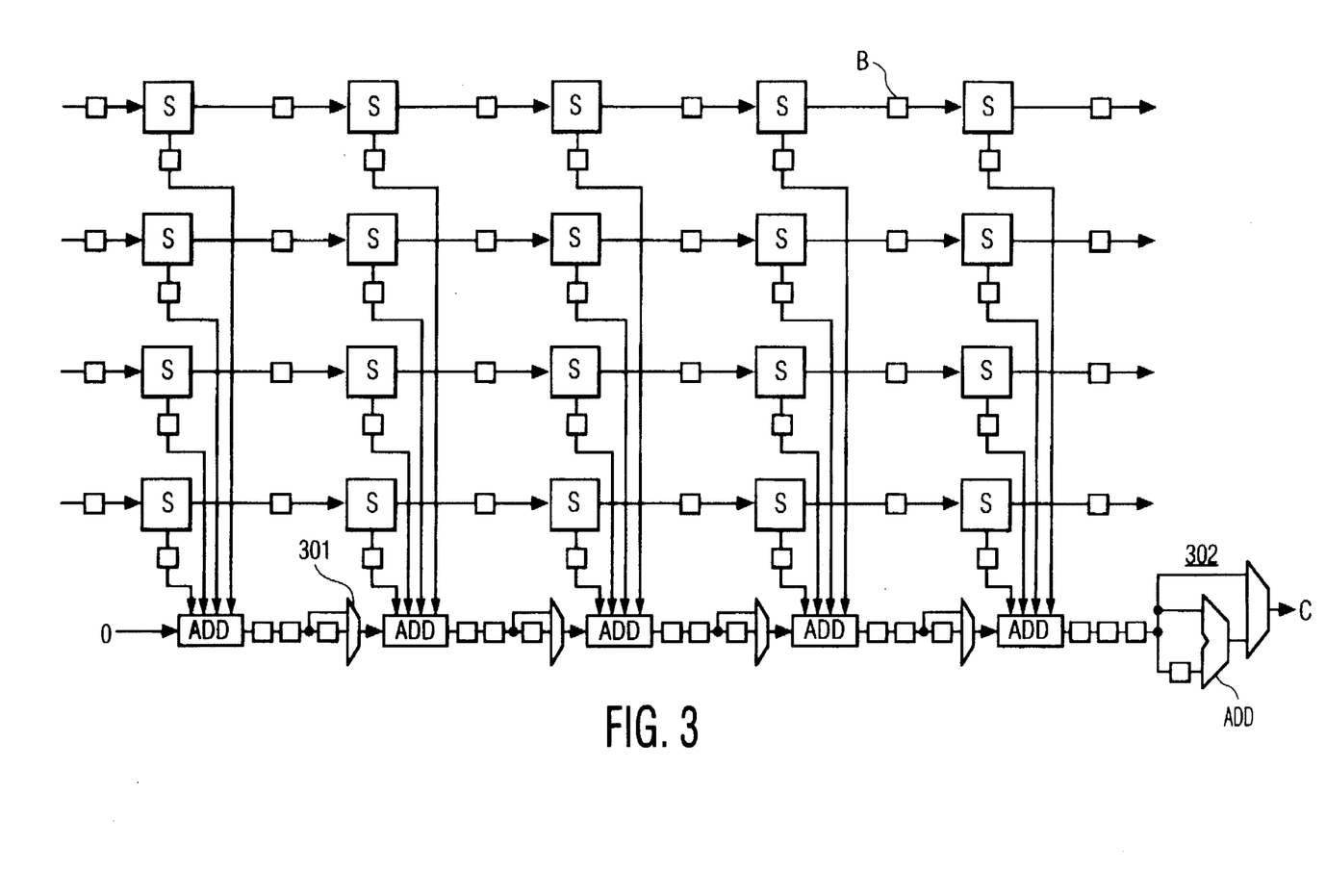
FIG. 3 is a general block diagram of a systolic network according to the embodiment.

FIG. 3 illustrates a systolic network of four lines and five columns. This network includes so-called "S" cells, buffers "B", adders "Add", by-pass cells 301 and a final by-pass cell 302.

The S cells execute the calculation |a−b|, where a and b are respectively the values of a pixel of the current block and of a pixel of the reference window. The output of each S cell of a given line is connected via a buffer B to the input of the next S cell. A buffer B is also present in front of each first S cell of a line. The values of b pixels move from one buffer to the following buffer on a given line during each cycle. The buffers hold the b values while the S cells carry out their calculations.

Each S cell also has an output C that supplies the result of the operation |a−b|. The outputs C are also connected to other buffers B (note: in FIG. 3, all buffers are labelled B, although they do not all have the same function). All such buffers of a given column are connected to the same adder Add. There are therefore as many adders as columns.

The output of an adder is connected to the input of the next adder by three buffers B in series. In the chosen method of operation, the last of these three buffers may or may not be short-circuited by a by-pass cell 301.

The final by-pass cell 302 supplies either a value of the error function at each cycle in normal non-interlaced operation, or a value of the error function every two cycles in interlaced mode. In the latter case, the adder integrated in this final by-pass cell 302 adds two consecutive values of the error function.

In a variant, the adders Add are in the form of "three-input carry-save adders".

Figure 4:
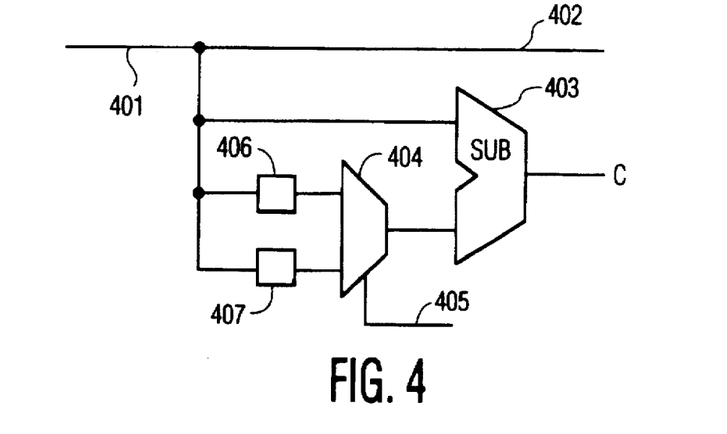
FIG. 4 is a general block diagram of a so-called "S" cell of the systolic network of FIG. 3.

FIG. 4 shows in more detail the function of an S cell. The S cell includes an input 401, an output 402 connected directly to the input 401, a calculation unit 403 with two inputs of which one is connected to the input 401 and the other to the output of a multiplexer 404 enabling selection via a selection line 405 either of the content of a buffer 406, or the content of a buffer 407. The inputs of the buffers 406 and 407 are also connected to the input 401 of the cell.

Each of the two buffers contains a pixel value of a current block. These values are loaded via the input 401 at the appropriate time. The control circuits of the buffers are classic and will not be described in detail. The presence of two buffers in parallel enables, among other things, the simultaneous storage of two current blocks in a single systolic network. In this way, two comparisons can be carried out for a given position in the reference window, which reduces the quantity of data transiting between the dynamic memory 110 and the coprocessor 103.

The presence of two buffers in each S cell also enables a so-called "interlaced" operation which doubles the number of lines of the current block relative to the number of lines of the systolic network. This operation will be discussed later.

The calculation unit supplies the absolute value of the difference of the two values present at its inputs.

We note that in this example, the b values of the pixels of the reference window are stored in the buffers B between the S cells, whereas the a values of the pixels of the current block(s) are stored in the buffers of the S cells.

We also note that the function totalizing the intermediate results produced by the S cells is performed entirely by the adders at the bottom of each column of S cells.

The normal (non-interlaced) operation of the systolic network will be explained with reference to FIG. 5, which represents a systolic network with a single line and eight columns. The operation of a network with a greater number of lines is quite similar, the results at the output of each S cell (output S) being presented at the same time to the adders. In normal operation, only two buffers B are necessary between each adder at the end of the column. For reasons of clarity, the third buffer and the by-pass cell are not shown in the figure.

The pixel values a are already memorized in the network. A b value is presented to the input of the network at each cycle. The table 1 represents the evolution of the outputs C over a number of cycles.

TABLE 1

| Cycle | C0 | C1 | C2 | C3 | C4 | C5 | C6 | C7 |
|---|---|---|---|---|---|---|---|---|
| 0 | — | — | — | — | — | — | — | — |
| 1 | |b0-a0| | — | — | — | — | — | — | — |
| 2 | |b1-a0| | |b0-a1| | — | — | — | — | — | — |
| 3 | |b2-a0| | |b1-a1| | |b0-a2| | — | — | — | — | — |
| 4 | |b3-a0| | |b2-a1| | |b1-a2| | |b0-a3| | — | — | — | — |
| 5 | |b4-a0| | |b3-a1| | |b2-a2| | |b1-a3| | |b0-a4| | — | — | — |
| 6 | |b5-a0| | |b4-a1| | |b3-a2| | |b2-a3| | |b1-a4| | |b0-a5| | — | — |
| 7 | |b6-a0| | |b5-a1| | |b4-a2| | |b3-a3| | |b2-a4| | |b1-a5| | |b0-a6| | — |
| 8 | |b7-a0| | |b6-a1| | |b5-a2| | |b4-a3| | |b3-a4| | |b2-a5| | |b1-a6| | |b0-a7| |
| 9 | |b8-a0| | |b7-a1| | |b6-a2| | |b5-a3| | |b4-a4| | |b3-a5| | |b2-a6| | |b1-a7| |
| 10 | |b9-a0| | |b8-a1| | |b7-a2| | |b6-a3| | |b5-a4| | |b4-a5| | |b3-a6| | |b2-a7| |
| 11 | |b10-a0| | |b9-a1| | |b8-a2| | |b7-a3| | |b6-a4| | |b5-a5| | |b4-a6| | |b3-a7| |
| 12 | |b11-a0| | |b10-a1| | |b9-a2| | |b8-a3| | |b7-a4| | |b6-a5| | |b5-a6| | |b4-a7| |
| 13 | |b12-a0| | |b11-a1| | |b10-a2| | |b9-a3| | |b8-a4| | |b7-a5| | |b6-a6| | |b5-a7| |
| 14 | |b13-a0| | |b12-a1| | |b11-a2| | |b10-a3| | |b9-a4| | |b8-a5| | |b7-a6| | |b6-a7| |

TABLE 1-continued

| Cycle | C0 | C1 | C2 | C3 | C4 | C5 | C6 | C7 |
|---|---|---|---|---|---|---|---|---|
| 15 | Ib14-a0I | Ib13-a1I | Ib12-a2I | Ib11-a3I | Ib10-a4I | Ib9-a5I | Ib8-a6I | Ib7-a7I |

During cycle 0, the b0 value is memorized in the first buffer B 501 at the input to the network. Only during cycle 1 is the result supplied by the first S cell memorized in the buffer 502 at output C0. During cycle 1, the value b0 is also memorized by the second buffer B 503.

At a certain time in the operation of the network, we should find at the output of the last adder the sum of all absolute values of the differences corresponding to a given position of the current block (a line of 8 pixels) in the reference window. The results that must be added in the adders for the first line of the reference window are shown in boldface characters in the table.

This totalization function affects the delay introduced by the buffers 504 between the adders. We can easily see that a delay of two cycles must be introduced in order that the propagation of the results to the adders is achieved correctly. This explains the presence of two buffers between each adder. Each buffer introduces a delay of one cycle. In other words, the two buffers 504 and 505 between the two first adders cancel the delay introduced by the buffers 501 and 502.

At the end of the fifteenth cycle, the value of the function Err for the first possible position of the current block is presented to the output 506 of the network.

We note that during this operation, only one of the two values to be memorized in each S cell is used. In a variant, a single memorization buffer of pixel values of the current block is used in each S cell.

Figure 6:
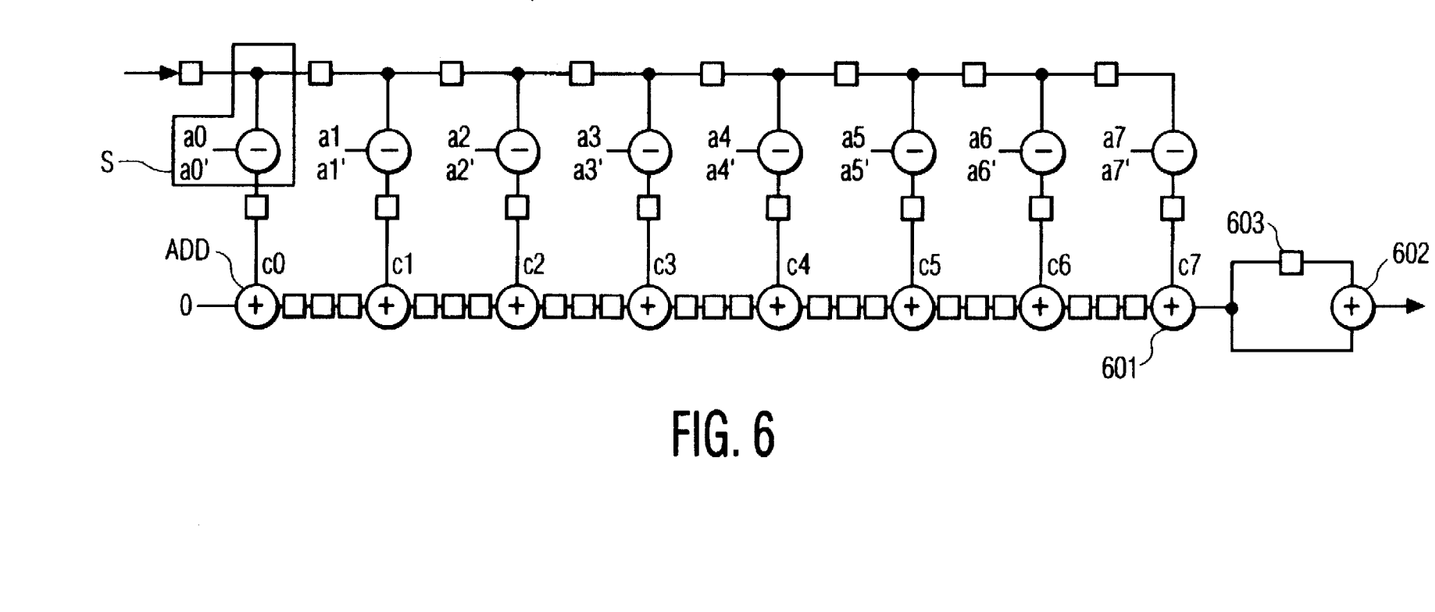
FIG. 6 is a general block diagram of a simplified systolic network according to the invention, used to illustrate the operation in interlaced mode.

FIG. 6 and table 1 illustrate the so-called "interlaced" operation of a systolic network. This method enables determination of the error function for current blocks including a number of lines equal to twice the number of lines of the systolic network. This is achieved simply by adding an extra buffer in each S cell and an extra buffer between each adder.

Figure 5:
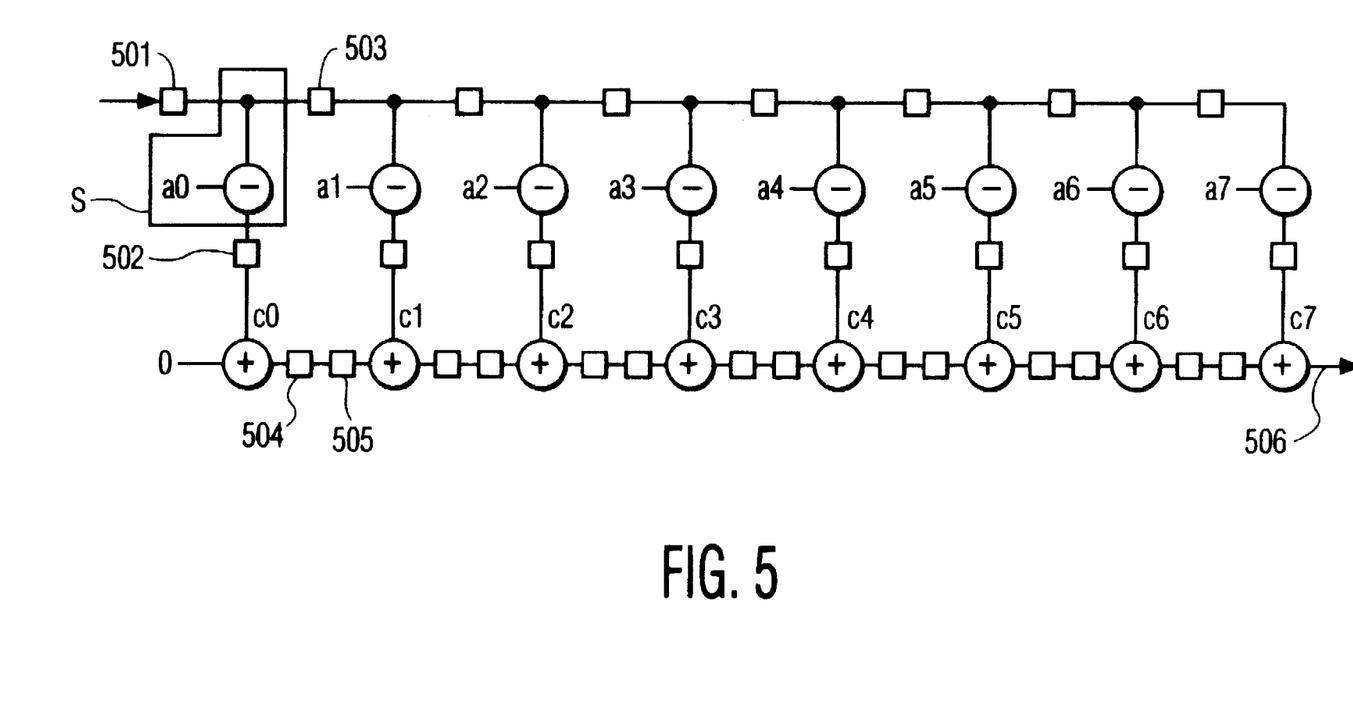
FIG. 5 is a general block diagram of a simplified systolic network according to the invention, used to illustrate the operation in non-interlaced mode.

FIG. 6 is similar to FIG. 5, except for the fact that a supplementary buffer is inserted between each pair of adders. Moreover, each S cell includes the two internal buffers as illustrated in FIG. 4. During the even cycles, the content of the first buffer of each S cell is multiplexed to the corresponding calculation unit, whereas during the odd cycles the content of the second buffer is used.

The current block of double size is separated into two sub-blocks a and a' superposed vertically. The first sub-block a is stored in the first buffers of each S cell, whereas the second sub-block a' is stored in the second buffers of each S cell.

In an identical manner, the band of the reference window has a double number of lines. It includes an upper sub-band b and a lower sub-band b'. During an even cycle, a column of the sub-band b is presented to the input of the systolic network, whereas during the odd cycles a column of b' is presented.

Table 2 gives the states of the outputs C after each cycle. As described previously, the boldface characters indicate the intermediate results that must be added to constitute an error function corresponding to a sub-block.

Compared with non-interlaced operation, this alternation between the two sub-blocks and the two sub-bands introduces a supplementary delay of one cycle between the presence at the output of an adder of the cumulated error corresponding to a given position and the presence of the intermediate result corresponding to the input of the next adder. For this reason, a third buffer is inserted between each pair of adders.

The last adder 601 of the network of FIG. 6 is connected both to a first input of an adder 602 and to a buffer 603 whose output is connected to the second input of the adder 602.

The error function corresponding to a sub-block is supplied at the output of the adder 601 at each cycle (once the network is correctly initialized). Table 2 shows that the error function value corresponding to the sub-block a' is lagging one cycle behind that corresponding to the sub-block a. The two values must be added to obtain the value of the error function corresponding to the entire block a+a'. During a first cycle, the value corresponding to a is memorized in the buffer 603. In the next cycle, the value corresponding to block a' is present at the output of the adder 601. The adder 602 calculates the sum. A valid result is therefore present at the output of the adder 602 every two cycles.

This "interlaced" operating mode is very interesting in that it enables reduction of the number of lines of the network and of the number of local memories (see below).

In a variant, the systolic network is designed to process current blocks having a number of lines equal to N times the number of lines of the network, where N is an integer greater than 2.

TABLE 2

| Cycle | C0 | C1 | C2 | C3 | C4 | C5 | C6 | C7 |
|---|---|---|---|---|---|---|---|---|
| 0 | — | — | — | — | — | — | — | — |
| 1 | Ib0-a0I | — | — | — | — | — | — | — |
| 2 | Ib0'-a0'I | Ib0-a1I | — | — | — | — | — | — |
| 3 | Ib1-a0I | Ib0'-a1'I | Ib0-a2I | — | — | — | — | — |
| 4 | Ib1'-a0'I | Ib1-a1I | Ib0'-a2'I | Ib0-a3I | — | — | — | — |
| 5 | Ib2-a0I | Ib1'-a1'I | Ib1-a2I | Ib0'-a3'I | Ib0-a4I | — | — | — |
| 6 | Ib2'-a0'I | Ib2-a1I | Ib1'-a2'I | Ib1-a3I | Ib0'-a4'I | Ib0-a5I | — | — |
| 7 | Ib3-a0I | Ib2'-a1'I | Ib2-a2I | Ib1'-a3'I | Ib1-a4I | Ib0'-a5'I | Ib0-a6I | — |
| 8 | Ib3'-a0'I | Ib3-a1I | Ib2'-a2'I | Ib2-a3I | Ib1'-a4'I | Ib1-a5I | Ib0'-a6'I | Ib0-a7I |
| 9 | Ib4-a0I | Ib3'-a1'I | Ib3-a2I | Ib2'-a3'I | Ib2-a4I | Ib1'-a5'I | Ib1-a6I | Ib0'-a7'I |
| 10 | Ib4'-a0'I | Ib4-a1I | Ib3'-a2'I | Ib3-a3I | Ib2'-a4'I | Ib2-a5I | Ib1'-a6'I | Ib1-a7I |

TABLE 2-continued

| Cycle | C0 | C1 | C2 | C3 | C4 | C5 | C6 | C7 |
|---|---|---|---|---|---|---|---|---|
| 11 | lb5-a0l | lb4'-a1'l | lb4-a2l | lb3'-a3'l | lb3-a4l | lb2'-a5'l | lb2-a6l | lb1'-a7'l |
| 12 | lb5'-a0'l | lb5-a1l | lb4'-a2'l | lb4-a3l | lb3'-a4'l | lb3-a5l | lb2'-a6'l | lb2-a7l |
| 13 | lb6-a0l | lb5'-a1'l | lb5-a2l | lb4'-a3'l | lb4-a4l | lb3'-a5'l | lb3-a6l | lb2'-a7'l |
| 14 | lb6'-a0'l | lb6-a1l | lb5'-a2'l | lb5-a3l | lb4'-a4'l | lb4-a5l | lb3'-a6'l | lb3-a7l |
| 15 | lb7-a0l | lb6'-a1'l | lb6-a2l | lb5'-a3'l | lb5-a4l | lb4'-a5'l | lb4-a6l | lb3'-a7'l |
| 16 | lb7'-a0'l | lb7-a1l | lb6'-a2'l | lb6-a3l | lb5'-a4'l | lb5-a5l | lb4'-a6'l | lb4-a7l |

Figure 7:
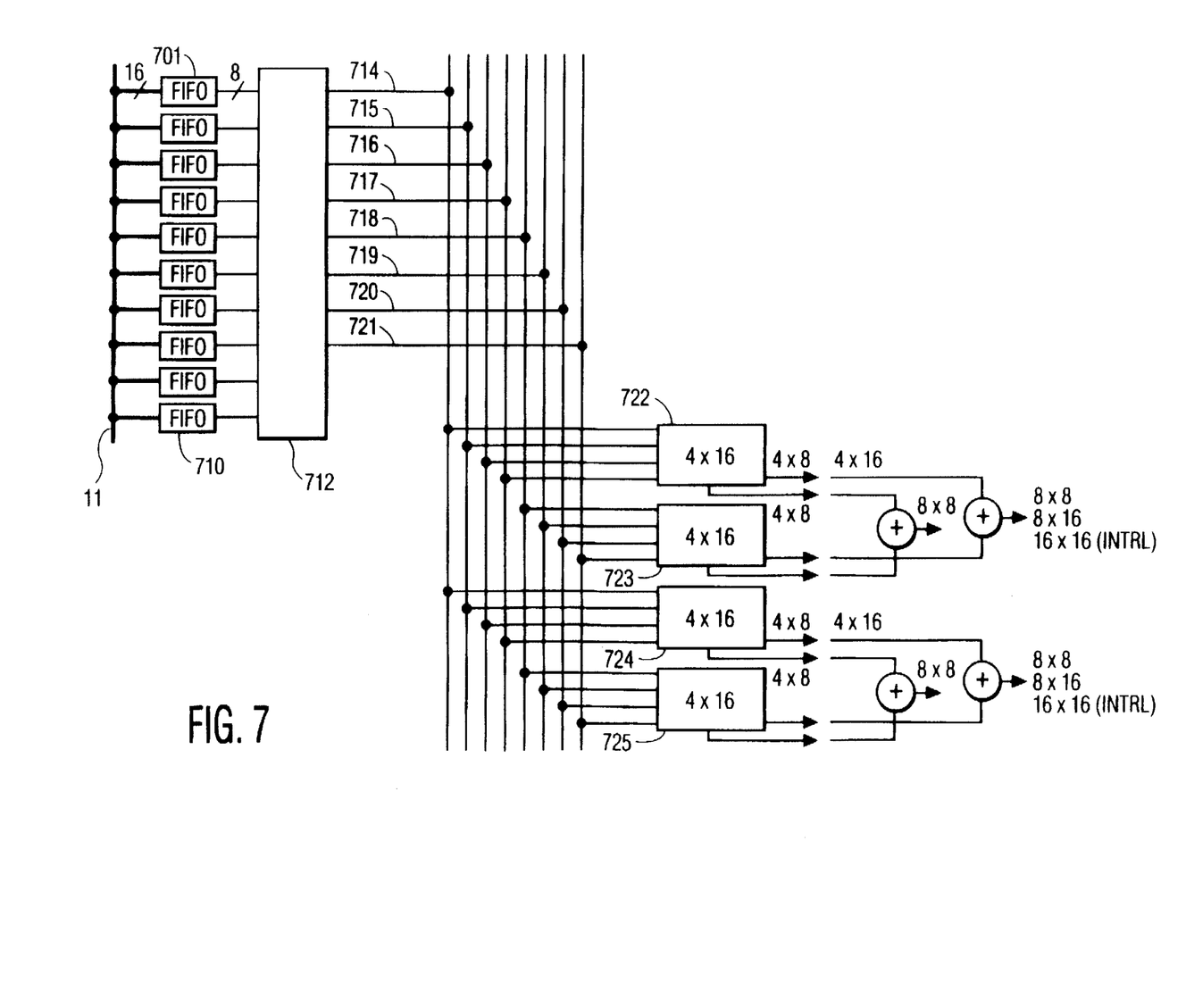
FIG. 7 is a general block diagram of the coprocessor in a first variant of the embodiment.

FIG. 7 shows schematically the coprocessor in a first variant of the embodiment. In this variant, the coprocessor includes ten FIFO stacks 701 to 710, connected in parallel on the data bus 11. The number of words of data per stack determines the number of columns of pixels of the search window. The outputs of the stacks 701 to 710 are connected to a switching circuit 712 having ten inputs and eight outputs 714 to 721.

The circuit 712 enables the output of any of the ten FIFO stacks (hereafter referred to as FIFOs) to be connected to any of the eight outputs of the circuit. Each FIFO contains a complete line of the search window. The eight FIFOs connected to an output at a given time correspond to the lines of the band of the search window processed.

The two supplementary FIFOs not connected are loaded via the data bus from the data stored in the memory 110. The data loaded correspond to the lines of the search window that differ from the bands currently being processed.

Suppose for example that the first band of eight lines L1 to L8 of a search window is contained in the FIFOs 701 to 708. During the processing of these eight lines, the line L9 is loaded in the FIFO 709. When the processing of the first band is completed, the line L1 stored in the FIFO 701 becomes useless. The second band contains the lines L2 a L9. The processing of this second band can therefore start without idle time, since the complete band is present in the FIFOs. The switching circuit must then re-establish the correct order of the lines memorized before presentation to the systolic networks 722 to 725.

In the case where the bands have eight lines, nine FIFOs are sufficient for the operation described. The tenth FIFO is used for example when we handle two bands of four lines in parallel.

In this variant, four systolic networks 722 to 725 of four lines and sixteen columns are each connected to the outputs of the switching circuit. By convention, we say that the output 714 represents the upper line of a band of eight lines, whereas the output 721 represents the lower line. The first and third networks (respectively 722 and 724) are connected to the four upper outputs 714 to 717, whereas the second and fourth networks (respectively 723 and 725) are connected to the four lower outputs 718 to 721.

The arrangement above enables current blocks of different sizes to be handled flexibly. In effect, we can consider the four networks in different ways:

Eight 4×16 networks, each 4×16 network processing two current blocks of 4×8 pixels;

Four 8×8 networks;

Two 8×16 networks;

Two 16×16 networks.

In the latter case, the networks operate in interlaced mode, only eight outputs being available and not sixteen. The eight outputs will supply alternately columns of eight pixels of an upper band and of a lower band of the reference window.

It is of course possible to use sixteen FIFOs instead of eight (excluding the FIFOs required for the loading of the line next).

As we have said previously, the capacity of the FIFO stacks determines the width of the reference window. In the case where we work with 4×8 networks, it is possible to group the FIFOs by two and store in each pair of FIFOs the equivalent of a line of pixels of double length.

FIG. 7 also indicates in the form of arrows the way in which the calculation results are grouped at the output of each 4×16 network according to the operating method.

Figure 8:
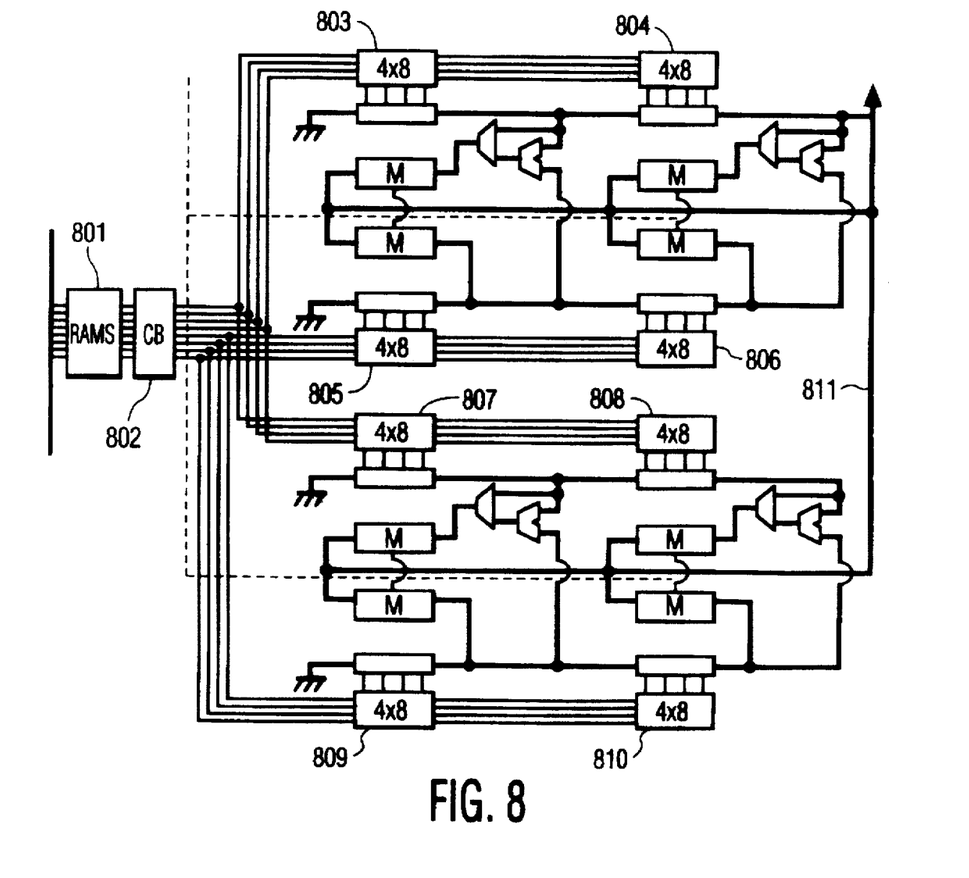
FIG. 8 is a second variant of the embodiment.

FIG. 8 illustrates a second variant of the embodiment. Nine FIFOs (grouped under the reference 801) feed a switching circuit 802. The coprocessor in this example includes eight 4×8 systolic networks 803 to 810. In fact, two 4×8 networks in cascade of FIG. 8 are equivalent to a 4×16 network of FIG. 7. FIG. 8 illustrates more clearly the routing of the calculation results of each of the networks when eight current blocks of 4×8 are processed in parallel. Let us take the example of the two upper networks 803 and 804. The final result (i.e. the value of the error function) at the output of the network 803 is transmitted directly to the network 804. Depending on whether we work with eight current blocks of 4×8 pixels or four current blocks of 8×8 pixels, this result at the output of the network 803 may or may not be available for subsequent processing. In the case where we work with 8 current blocks of 4×8 pixels, this result will be necessary for the determination of the movement vector of the current block processed by the network 803.

In this variant, a cell M is associated with each 4×8 network. Each cell M determines the minimum value of the error function at output of one of the networks, and memorizes the coordinates of the corresponding movement vector. The results are sent via a specific data bus 811.

The outputs of the networks 803, 804, 807 and 808 are each connected to the input of a multiplexer, whose output is connected to the input of the associated cell M. The output of each of these same networks is also connected to the input of a two-input adder that receives on its other input the output of the network immediately below. For the networks 803, 804, 807 and 808, these are respectively outputs of the networks 805, 806, 809 and 810.

When the processor works on eight current blocks, the output of each network is directly connected to the associated cell M. Each cell M then determines on its own the minimum value of the error function and the movement vector. This produces eight distinct vectors.

When the processor works on four blocks of 8×8 pixels, the multiplexers switch in order that one of the cells M associated with two superimposed networks working on the same block receive the sum of the values of the error function calculated by these two networks. Only the vector determined by the cell receiving this sum will be taken into account later.

The switching of the multiplexers is controlled by the controller 102 of FIG. 1.

What is claimed is:

1. Device for estimation of movement by block matching in an image compression system based on pixel blocks, said device comprising:
   N lines of M columns of means of calculation of an error function between two values,
   N lines of M columns of first means of memorization adapted to store values representing a block of pixels whose movement is to be estimated;
   N lines of M columns of second means of memorization adapted to propagate column by column values representing a band of pixels of a reference window, said first and second means of memorization being linked respectively to the means of calculation;
   M adders adapted to totalize the values of the error function for each column of N means of calculation, an output of an adder associated with a given column of N means of calculation being coupled to an input of the adder associated with the next column of N means of calculation;
   means for delaying the transmission of a result of the addition by an adder for a given column to a consecutive adder by a delay which is a function of the propagation of the values representing the reference window in said N lines of M columns of said second means of memorization.

2. Device according to claim 1, wherein said N lines of M columns of second means include a network of N lines, each line comprising M buffers connected in series, a band of values representing the reference window being propagated column by column in the network.

3. Device according to claim 2, wherein the output of each buffer is connected to the input of a means of calculation of the error function.

4. Device according to claim 3, wherein each means of calculation calculates an error function from the value at the output of the buffer and a value representing the block where movement is to be estimated.

5. Device according to claim 4, wherein the result of the calculation of each of the means of calculation is memorized in a buffer.

6. Device according to claim 1, wherein said delay is produced by buffers in series between the adders.

7. Device according to claim 1, wherein each of said first means for memorization of values representing the block whose movement is to be estimated memorizes have pixel values, one of these two values being multiplexed to the means of calculation of the error function.

8. Device according to claim 2 wherein said two values respectively represent a lower and an upper sublock of a given block, the values supplied to a network being alternating values representing an upper sub-band and a lower sub-band of the reference window, this operation being known as "interlaced" mode.

9. Device according to claim 8, wherein said device includes means of addition of the totalized values of the error function corresponding to these two sub-blocks.

10. Device according to claim 8, wherein in interlaced mode, a supplementary delay of one calculation cycle is introduced between the adders.

11. Device according to claim 2, wherein each of said N lines of buffers is fed by third means of memorization of which each stores a line of the reference window.

12. Device according to claim 11, wherein each of said means of memorization comprises a first-in-first-out stacks.

13. Device according to claim 11, wherein there are at least N+1 means of memorization of lines, and when N of said at least N+1 means of memorization feed N lines of buffers, the means of memorization other than said N means of memorization are loaded with values corresponding to the lines that differ between a band of the reference window memorized in said N means of memorization of lines and a band whose processing is immediately consecutive.

14. Device according to claim 13, characterized in that it includes a switching circuit between the means of memorization of lines and a network of buffers, said means of switching connecting the means of memorization of lines to the appropriate lines of buffer.

15. Device according to claim 1, for calculation of movement vectors in an image compression system comprising:
   means for input,
   means for output,
   means for control associated with a memory,
   means for memorization of parts of current images and of reference images,
   means for addressing the said means of memorization of parts of current images and of reference images,
   means for calculation of an error function between the parts of current images and parts of reference images, and
   means for interfacing with said means for control.

16. Device according to claim 15, wherein said means for input are ports used to load data representing said images in said means of memorization of parts of current images and of reference images via a data bus.

17. A device for estimation of movement by block matching in an image compression system based on pixel blocks, said device comprising:
   N lines of M columns of means of calculation of an error function between two values;
   N lines of M column of first means of memorization adapted to store values representing a block of pixels whose movement is to be estimated;
   N lines of M columns of second means of memorization adapted to propagate column by column values representing a band of pixels of a reference window, said first and second means of memorization being linked respectively to said means of calculation and
   M adders adapted to totalize the values of the error function for each column of N means of calculation,
   wherein each of said first means for memorization of values representing the block whose movement is to be estimated memorizes two pixel values, said first means comprising a multiplexer for multiplexing one of said two pixel values to said means of calculation, said two pixel values respectively representing a lower and an upper sub-block of a given block.

18. A device according to claim 17, wherein said N lines of M columns of second means include a network of N lines, each line comprising M buffers connected in series, a band of values representing the reference window being propagated column by column in this network.

19. A device according to claim 18, the values supplied to said network being alternating values representing an upper sub-band and a lower sub-band of the reference window, this operation being known as "interlaced" mode.

20. A device according to claim 19, wherein said device includes means of addition of the totalized values of the error function corresponding to these two sub-blocks.

21. A device according to claim 17 wherein an output of an adder associated with a given column of N means of calculation is coupled to an input of the adder associated with the next column of N means of calculation.

22. A device for estimation of movement by block matching in an image compression system based on pixel blocks, said device comprising:

- N lines of M columns of means of calculation of an error function between two values;
- N lines of M columns of first means of memorization adapted to store values representing a block of pixels whose movement is to be estimated;
- N lines of M columns of second means of memorization adapted to propagate column by column values representing at least one band of pixels of a reference window, said first and second means of memorization being linked respectively to said means of calculation;
- M adders adapted to totalize the values of the error function for each column of N means of calculation;
- at least N+1 third means of memorization, each of said third means storing a line of said reference window, N among said at least N+1 third means of memorization being adapted to feed said N lines of said second means of memorization at a given time, the remaining at least one third means being adapted to being loaded with values corresponding to lines which differ between a band stored in said N among said at least N+1 third means and a band to be processed subsequently.

23. A device according to claim 22, further comprising a switching circuit between said second means of memorization and said third means of memorization, said switching circuit being adapted to connect N among said at least N+1 third means of memorization to said N lines of second means of memorization.

24. A device according to claim 22 wherein an output of an adder associated with a given column of N means of calculation is connected to an input of the adder associated with the next column of N means of calculation.

* * * * *